Nov. 8, 1966   D. R. SELF   3,283,854
CABLE LUBRICATING TOOL
Filed April 2, 1964
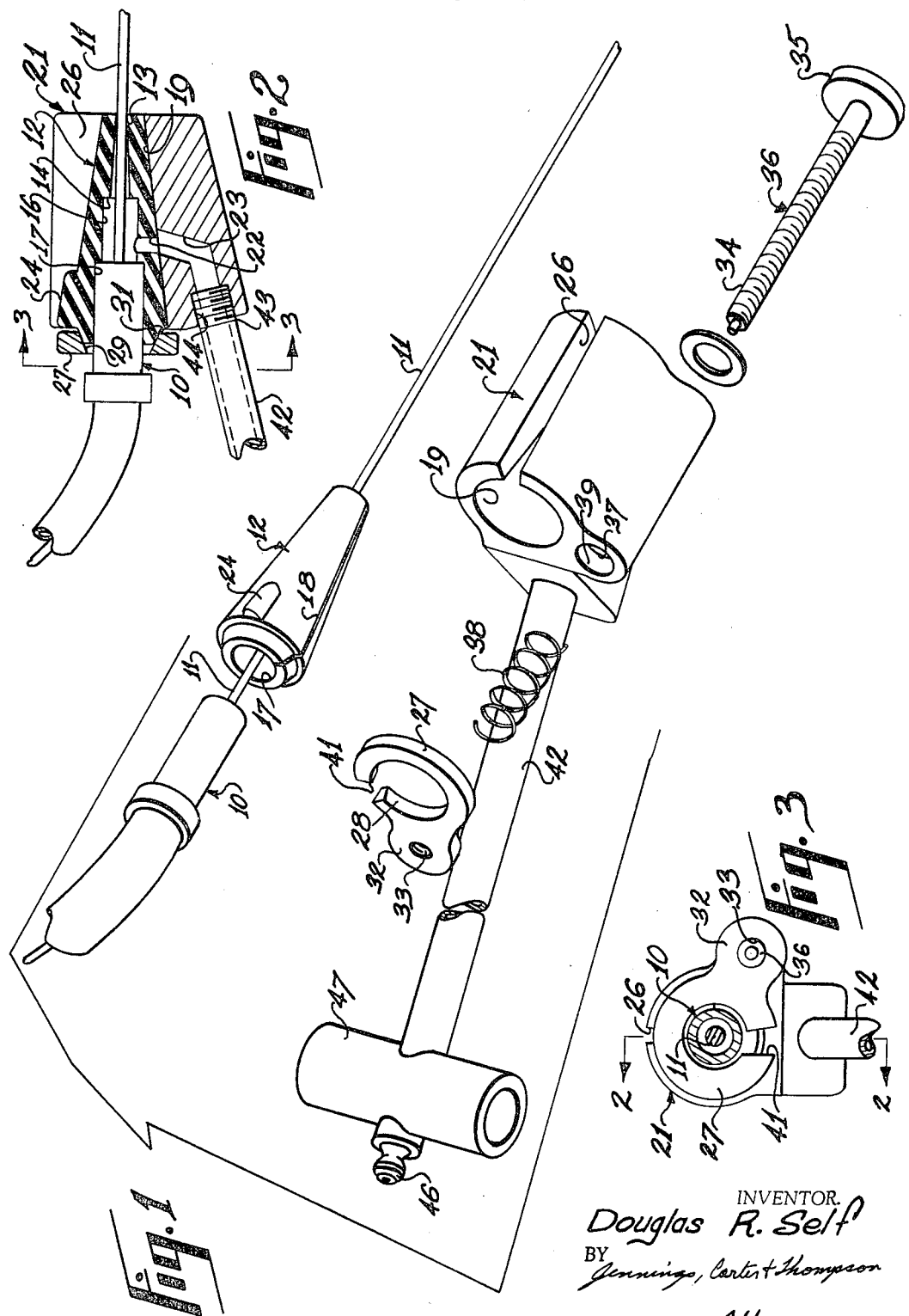
INVENTOR.
Douglas R. Self
BY
Jennings, Carter & Thompson
Attorneys United States Patent Office 3,283,854
Patented Nov. 8, 1966

3,283,854
CABLE LUBRICATING TOOL
Douglas R. Self, Birmingham, Ala., assignor to
Fred S. Himebauch, Birmingham, Ala.
Filed Apr. 2, 1964, Ser. No. 356,804
4 Claims. (Cl. 184—105)

This invention relates to a cable lubricating tool and more particularly to a tool for lubricating a cable which telescopes into an end of a tube-like housing with a portion of the cable projecting outwardly of the housing.

An object of my invention is to provide a lubricating tool which shall be particularly adapted for introducing lubricant into a tube-like housing which encases a cable where the end of the housing is in an inaccessible location.

Another object of my invention is to provide a cable lubricating tool of the character designated which may be easily and quickly attached to the end of the tube-like housing without having to disconnect the cable from its operating mechanism.

A further object of my invention is to provide a cable lubricating tool of the character designated which defines a lubricant transfer passageway adjacent the end of the tube-like housing whereby all of the lubricant introduced passes directly into the housing without wastage of the lubricant and without the lubricant coming in contact with adjacent surfaces or articles, thus particularly adapting my improved apparatus for use in lubricating clutch cables for certain vehicles, such as Volkswagen cars and trucks.

A still further object of my invention is to provide a cable lubricating tool of the character designated which shall be simple of construction, economical of manufacture and one which requires a minimum of time and effort to operate the tool and maintain the tool in a clean working condition.

Apparatus embodying features of my invention is illustrated in the accompanying drawing, forming a part of this application, in which:

FIG. 1 is an exploded view showing the various parts of my cable lubricating tool and the manner in which it is attached to a cable which telescopes into a tube-like housing;

FIG. 2 is a sectional view taken along the lines 2—2 of FIG. 3; and,

FIG. 3 is a sectional view taken generally along the line 3—3 of FIG. 2.

As is well known in the art to which my invention relates, it is very difficult to lubricate cables which pass through tube-like housings since such cables and housings are often located at inaccessible positions whereby they cannot be reached by a mechanic except by removing the entire cable and housing therefor. Accordingly, it often takes several hours to remove such a unit and reinstall the same after lubrication. This is particularly true in the lubrication of the clutch cable on certain vehicles, such as Volkswagen cars and trucks. Oftentimes, mechanics attempt to lubricate the cable and housing therefor without removing the cable and housing unit. When this is attempted, the lubricant cannot be forced inwardly of the housing around the cable in an effective manner and at the same time the lubricant comes in contact with articles and surfaces adjacent the cable unit whereby the lubricant later contacts articles of clothing and the like.

To overcome the above and other difficulties, I provide a composite cable lubricating tool which completely encases the open end of the tube-like housing and grips the cable in spaced relation to the end of the housing whereby a lubricant passageway is provided for forcing the lubricant into the end of the tube-like housing. Accordingly, the entire tube-like housing is filled with lubricant in a minimum of time and at the same time the lubricant does not come into contact with adjacent articles and surfaces. Also, it is not necessary to remove the housing or disconnect the cable from its actuating mechanism prior to lubrication.

Referring now to the drawing for a better understanding of my invention, I show an elongated tube-like housing 10 which encases a flexible cable 11. In the drawing, I show housing 10 and cable 11 as being of the type employed in Volkswagen cars and trucks for actuating the clutch. Accordingly, in the drawing, both the housing 10 and the cable 11 are shown as being flexible units. However, it will be apparent that the housing 10 could be of a rigid structure, if desired.

As shown in FIGS. 1 and 2, I provide a resilient member 12 having an outer surface which tapers toward one end thereof. The resilient member 12 is formed of a suitable oil resistant material, such as oil resistant synthetic rubber of the like. The resilient member 12 is provided with an axially extending opening therethrough for receiving the adjacent end of the tube-like housing 10 and the cable 11, as shown in FIG. 2. Adjacent the smaller end of the resilient member 12, the axially extending opening is of a size to receive the cable 11 with a snug fit as at 13. The intermediate portion of the axially extending opening through the resilient member 12 is enlarged as at 14 to define a lubricant receiving chamber 16 intermediate the adjacent end of the housing 10 and the portion of the resilient member which engages the cable 11, as clearly shown in FIG. 2. The portion of the axially extending opening through the resilient member 12 which receives the housing 10 is enlarged as at 17 whereby it receives the adjacent end of the housing 10 with a snug fit. A longitudinally extending slit 18 is provided in the resilient member 12, as shown in FIG. 1, whereby the cable 11 may be easily inserted into the axially extending opening without disconnecting the end of the cable 11 from its actuating means.

As shown in FIGS. 1 and 2, the resilient member 12 is adapted to move into engagement with a tapered recess 19 provided in a rigid housing 21. That is, the tapered recess 19 corresponds generally to the exterior surface of the resilient member 12 whereby upon forcing the resilient member 12 inwardly of the tapered recess 19, the resilient member is forced inwardly to thereby cause the end portions thereof to firmly engage the cable 11 and the adjacent end of the housing 10, as shown in FIG. 2. A radially extending lubricant passageway 22 extends through one side of the resilient member 12 in position for one end thereof to communicate with the lubricant receiving chamber 16. The other end of the passageway 22 is adapted to move into alignment with a lubricant passageway 23 which is provided through the rigid housing 21. To align the lubricant passageways 22 and 23 with each other, I provide an outwardly projecting detent 24 on the resilient member 12 in position to move inwardly of a longitudinally extending slot 26 provided in the rigid housing 21. The elongated slot 26 also provides a passageway for receiving the cable 11 whereby the cable does not have to be disconnected from its actuating means for insertion into the rigid housing.

To force the resilient member 12 inwardly of the tapered recess 19 and retain the same in place, I provide a retaining bracket 27 having an opening 28 therethrough for receiving the adjacent end of the resilient member 12, as shown in FIG. 2. The inner surface of the opening 28 flares outwardly as at 29 in position to engage a corresponding sloping surface 31 provided on a reduced portion of the resilient member 12, as shown in FIG. 2. Accordingly, upon forcing the retaining bracket 27 inwardly toward the resilient member 12, the resilient member is urged inwardly of the tapered recess 19 and at the same time the outer end of the resilient member is urged into firm engagement with the housing 10 by movement of the cooperating sloping surfaces 29 and 31. Accordingly, the apparatus is anchored firmly to the housing 10. Also, movement of the resilient member 12 inwardly of the tapered recess 19 causes the inner end of the resilient member to engage firmly the cable 11 as at 13.

The retainer bracket 27 is provided with an outwardly projecting lug 32 having a threaded opening 33 therein for receiving a threaded end 34 of an elongated member 36 that is adapted for rotation in a longitudinally extending opening 37 provided in a side of the rigid housing 21. A suitable operating knob 35 is provided at the end of the member 36. Accordingly, upon rotation of the elongated member 36, the retainer bracket 27 is moved toward and away from the adjacent end of the housing 21. To urge the retainer element 27 away from the adjacent end of the resilient member 12 upon rotating the member 36 in a direction to release the retainer bracket, I provide a spring 38 which is adapted to encircle the end of the threaded member 36 intermediate the retainer bracket 27 and the fixed housing 21. Preferably, the outer end of the opening 37 through the housing 21 for receiving the threaded member 36 is enlarged in diameter as at 39 to provide an annular seat for the spring 38. An outwardly opening slot 41 is provided in a side of the retainer bracket 27 whereby the cable 11 may be inserted in the opening 28 to eliminate the necessity of detaching the cable from the actuating means therefor.

Lubricant is supplied to the passageway 23 in the housing 21 by an elongated tube-like member 42. External threads 43 are provided adjacent one end of the tube 42 for engaging internal threads 44 provided adjacent the outer end of the lubricant passageway 23, as shown. The outer or other end of the tube-like member 42 is provided with a conventional type lubricant fitting 46 whereby lubricant may be introduced through the tube 42 and the passageways 23 and 22 to the lubricant receiving chamber 16 whereupon the lubricant is forced inwardly of the housing 10. A suitable transverse handle member 47 is secured to the outer end of the tube-like member 42 adjacent and inwardly of the lubricant fitting 46 whereby the apparatus may be moved to and from operating position with a minimum of effort.

From the foregoing description, the operation of my improved apparatus will be readily understood. The resilient member 12 is positioned over the cable 11 by passing the cable 11 through the longitudinally extending slit 18, as shown in FIG. 1. The rigid housing 21 is then positioned over the cable 11 by passing the cable through the longitudinally extending slot 26. The resilient member 12 is then moved axially along the cable 11 inwardly of the tapered recess 19 in the housing 21 whereby the outwardly projecting detent 24 moves inwardly of the slot 26 to thereby align the lubricant passageways 22 and 23 for receiving lubricant from the tube 42. The retaining bracket 27 is rotated about the threaded member 36 whereby the cable 11 moves inwardly of the outwardly opening slot 41 into the opening 28. With the elements thus assembled, the housing 21 is pulled forward to thereby seat the housing 10 within the enlarged portion 17 and at the same time the knob 35 is rotated in a direction to move the retainer bracket 27 toward the resilient member 12, thus securing the end of the housing 10 firmly in place within the adjacent end of the axially extending opening in the resilient member 12 and at the same time causing the opposite end of the resilient member to move into firm engagement with the cable 11, thus preventing the escape of lubricant from either end of the axially extending opening through the resilient member 12. Lubricant is then introduced through the fitting 46 by suitable means, such as with a conventional type grease gun. Where a flexible housing 10 is employed, the flexible housing should be moved up and down during the application of the lubricant whereby the lubricant passes into contact with all sides of the cable. Preferably, the apparatus is thoroughly cleaned after each lubrication by employing a suitable solvent. Also, a small amount of lubricant is applied to the resilient member 12 before use.

From the foregoing, it will be seen that I have devised an improved cable lubricating tool. By providing a lubricating tool which may be assembled and disassembled about a cable which projects outwardly of a tube-like housing, together with improved means for preventing the escape of lubricant outwardly of the tool, all of the lubricant is applied inwardly of the housing whereby the entire length of the housing is thoroughly lubricated without having to disassemble the housing. Furthermore, by providing a tool having an elongated tube through which the lubricant is introduced into the tool, the tool may be positioned easily at any desired location even though the cable is located in a position which is difficult to reach.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a tool for lubricating a cable which telescopes into an end of a tube-like housing with a portion of the cable projecting outwardly of the housing:
   (a) a resilient member having an outer surface which tapers toward one end thereof,
   (b) there being an axially extending opening through said resilient member of a size adjacent the smaller end thereof to receive said cable with a snug fit and of a size adjacent the larger end thereof to receive the adjacent end of said tube-like housing to define a lubricant receiving chamber intermediate said smaller end of said resilient member and said adjacent end of the tube-like housing,
   (c) there being a longitudinally extending slit in one side of said resilient member communicating with said axially extending opening for receiving said cable,
   (d) a rigid housing having a tapered recess therein corresponding to and of a size to receive the outer tapered surface of said resilient member,
   (e) there being a longitudinally extending slot in said rigid housing in communication with said tapered recess and of a size to receive said cable,
   (f) there being lubricant passageways through said rigid housing and said resilient member disposed to move into alignment with each other and communicate with said lubricant receiving chamber,
   (g) means to hold said resilient member inwardly of said tapered recess,
   (h) means to introduce lubricant through said lubricant passageways whereby the lubricant passes through said lubricant receiving chamber into said tube-like housing, and
   (i) a detent carried by said resilient member in position to engage said slot in the rigid housing whereby the lubricant passageway in said resilient member is aligned with the lubricant passageway in said rigid housing.

2. In a tool for lubricating a cable as defined in claim 1 in which the means to hold said resilient member inwardly of said tapered recess comprises:
   (a) an elongated threaded actuating member carried by said rigid housing and adapted for rotation relative thereto,
   (b) a retainer bracket threadedly connected to said actuating member adjacent the larger end of said tapered recess in position to engage the larger end of said resilient member whereby upon rotation of said actuating member said bracket is moved toward and away from said resilient member, and (c) there being an opening through said bracket for receiving the adjacent end of said tube-like housing.

3. In a tool for lubricating a cable as defined in claim 2 in which the bracket is provided with an outwardly opening slot therein in communication with said passageway therethrough in position to receive said cable.

4. In a tool for lubricating a cable as defined in claim 2 in which the opening through the retainer bracket flares outwardly toward the adjacent end of the resilient member and said adjacent end of the resilient member tapers inwardly toward said retainer bracket for engagement with the outwardly flaring portion of the retainer bracket.

References Cited by the Examiner

UNITED STATES PATENTS

| | | | |
|---|---|---|---|
| 2,140,426 | 12/1938 | Hodson | 184—15 |
| 2,531,095 | 11/1950 | Williams | 184—16 |
| 3,101,812 | 8/1963 | Mercer | 184—105 |

FOREIGN PATENTS

| | | |
|---|---|---|
| 1,017,427 | 10/1957 | Germany. |
| 418,009 | 10/1934 | Great Britain. |
| 528,648 | 6/1955 | Italy. |

SAMUEL ROTHBERG, *Primary Examiner.*

LAVERNE D. GEIGER, *Examiner.*

E. EARLS, *Assistant Examiner.*